United States Patent Office 3,405,011
Patented Oct. 8, 1968

3,405,011
ELECTRODE COMPRISING THIN POROUS
METALLIC MATRIX AND PROCESS FOR
MAKING SAME
Giovanni Caprioglio, San Diego, Calif., assignor, by mesne assignments, to Gulf General Atomic Incorporated, San Diego, Calif., a corporation of Delaware
No Drawing. Filed Nov. 12, 1964, Ser. No. 410,707
18 Claims. (Cl. 136—120)

This invention relates to electrochemical cells and more particularly to a process for making electrodes for such cells and to the electrodes which are the products of the process.

Porous metal electrodes have been used with liquid electrolytes for some time in electrochemical cells, such as fuel cells, primary batteries, and secondary batteries. Such porous electrodes generally are used to supply a gaseous reactant to the electrochemical reaction.

Various processes have been developed for producing electrodes having the particular porosity desired. Electrodes have been sintered from metal particles. Electrodes have been made by hot-pressing mixtures of metal powder and a decomposable substance and subsequently heating to drive off the decomposable substance and leave a porous metal structure. Electrodes have been made by forming a structure of an alloy of the desired metal powder and another metal and then leaching out the second metal using a suitable solvent. None of these electrodes have been entirely satisfactory.

Recently, it has been found that increased efficiency in electric power generation can be obtained by bubbling a readily available gaseous mixture, such as air, through a porous electrode into liquid electrolyte in an electrochemical cell. This improved method of generating electric power is more fully described in pending patent application, Serial No. 384,132, filed July 21, 1964, and assigned to the assignee of this application. In order to efficiently utilize a bubbling electrode, it is important that the electrode has a closely controlled porosity. For efficient operation, the electrode should provide a large area of solid-liquid-gas interface. Furthermore, the electrode structure should be such that the reactant gas will diffuse across the entire surface of the electrode. Electrodes made by processes provided by the prior art have not proved entirely satisfactory for such applications.

Flooding is another problem which electrodes of this general type encounter. When the electrochemical cell remains idle for a period of time, the electrolyte intrudes into the porous structure. When this occurs, electrodes become inoperative and it is necessary to remove the electrode from the cell to purge the electrolyte therefrom. Electrodes which obviate the problems attendant to flooding are desired.

It is the principal object of the present invention to provide an improved process for the manufacture of electrodes for electrochemical cells. It is another object to provide an improved electrode for the generation of high density electric current in an electrochemical cell. It is a further object to provide a process for manufacturing a thin, strong electrode with controlled porosity and excellent diffusional characteristics that is not troubled by problems of flooding. It is a still further object to provide a process of manufacturing an electrode in a simple operation that provides a porous metal electrode with a catalyst incorporated therein. Another object is the provision of an improved electrode especially suited to serve as an air cathode opposite a consumable metal anode for the production of high density electrical current in an electrochemical cell using a liquid electrolyte. Still another object is to provide an improved electrode which incorporates a platinum metal catalyst and a process for inexpensively manufacturing the same. These and other objects of the invention are more particularly set forth in the following detailed description of processes embodying various features of the invention.

In general, the invention provides a process for making a porous electrode for an electrochemical cell by removing an inert substance from a composite structure by electrolytic attack to create pores in the locations once occupied by the inert substance.

Particles of a metal that is resistant to electrolytic attack when operated as an electrode in an electrochemical cell and particles of an inert substance that is subject to electrolytic attack are thoroughly mixed, and the mixture is compacted and heated to form a self-supporting structure in the desired shape of the electrode. The structure is immersed in a liquid electrolyte and connected via an external electrical circuit to another electrode in the electrolyte. Sufficient electrical power is applied to the electrodes to cause electrolysis. The electrolytic action attacks the inert substance removing it from the self-supporting electrode structure and leaving a porous metal matrix.

The process produces an electrode which has a minor percentage of large pores spaced substantially uniformly across the electrode and a major percentage of small pores sized substantially below the large pores. The small pores form networks of interconnected pores which surround each of the large pores and are in communication therewith. The sizes of the pores are determined by the selected sizes of the particulate starting materials and the forming techniques used.

When an electrode of this type is used with a gaseous mixture of a reactant gas and a diluent gas, the mixture is slowly bubbled through the large pores and diffuses from each of the large pores into the interconnected network of small pores surrounding it. In an electrode having this structure, a large interfacial area is provided between gas and liquid electrolyte. It is believed the reactant gas diffuses a short distance into the liquid to the adjacent liquid solid interface where the electrochemical reaction takes place.

The particular starting materials used in the process are, of course, determined by the type of electrode desired and the nature of the cell in which it will be used. Electrodes for various types of electrochemical cells, including fuel cells, primary batteries, and secondary batteries, can be made by this process. For purposes of illustration, the process will hereinafter be generally discussed in connection with the manufacture of a cathode suitable for use in a secondary battery that utilizes a consumable metal anode and an aqueous caustic electrolyte, an application for which electrodes produced by the process are considered especially well suited.

One such secondary battery which utilizes an air cathode, a consumable zinc anode, and an aqueous caustic electrolyte is more fully described in pending patent application, Ser. No. 259,016, filed Feb. 18, 1963 and now abandoned. This secondary battery utilizes air from the atmosphere, compressing it by a blower operating on electrical power generated by the battery cell and feeding the compressed air to the porous cathode. The porosity of the cathode is such that a fairly low pressure is sufficient to cause air to bubble through the porous electrode. A proportion of the oxygen in the air reacts at the cathode. The remainder of the oxygen and all of the nitrogen bubble into the liquid electrolyte whence these gases are eventually vented back to the atmosphere.

In general, an electrode having any porosity within a fairly wide range may be operated by bubbling a gaseous reactant therethrough, of course the lower the porosity is, the higher a pressure it will take. However, there are some practical limitations. In a secondary battery, an electrode which will operate on a fairly low air pressure is desirable because the electrical power required to operate the compressor is normally supplied from the battery output and accordingly reduces the net power output of the battery. An electrode which will effectively operate under bubbling conditions on an air pressure of between about 5 and about 30 p.s.i.g. is considered desirable.

Electrodes may be made in any suitable shape desired for a specific electrochemical cell. For example, the electrodes may be cylindrical, planar or curvilinear. Also, electrodes of this type generally have a gas-supply surface and a liquid-contact surface on opposite sides of a relatively thin porous wall. The above-mentioned secondary battery utilizes electrodes in the shape of flat plates, one surface of which is in contact with the liquid electrolyte. For purposes of simplification, electrodes will hereinafter be spoken of as being flat plates although it should be understood that they may have any suitable configuration.

In a secondary battery which uses a consumable metal electrode and a reactant gas as the electrochemical couple, the porous electrode at which the gas is supplied must be made of an electrically conductive material which is inert to the electrolyte and which is resistant to electrolytic attack, either anodic or cathodic. Depending upon whether the battery is on discharge or charge, the electrode will operate either as a cathode or as an anode. For purposes of identification however, common nomenclature will be used and the porous electrode which supplies the electronegative gas will be referred to as the cathode. Metals from which suitable porous electrodes can be made include, for example, stainless steel, nickel, cobalt and silver. For the secondary battery which uses a consumable zinc anode and an aqueous caustic electrolyte, the cathode is preferably made of nickel.

The physical characteristics of the starting material, the proportions in which they are used, and the conditions under which the self-supporting structure is formed are determinative of the physical properties of the resultant electrode. The operating characteristics of the electrochemical cell in which the electrode is to be used sets the requirements for the physical characteristics of the electrodes, e.g. porosity, pore spectrum, surface configuration, etc. The type of gas supply used also influences these characteristics. Electrodes which operate with a gaseous mixture comprising a reactant gas and a diluent gas generally have larger pores than electrodes which operate upon a reactant gas alone.

In order to reduce the current per $cm.^2$ of active surface (real current density) and improve the kinetics of the electrochemical reaction, the surface area of the electrode must be very large. Therefore, metal particles which have a very large surface area per unit mass (about 0.1–1 $meter^2/gram$) are preferably used. Furthermore, it has been found that the manufacturing process should be carefully regulated so that these physical characteristics of the metal particles are not destroyed. One example of metal particles which have this desirable configuration are those produced by the controlled thermal decomposition of a metal carbonyl.

The particle size and shape of the metal particles determines the size, shape and distribution of the small pores. The small pores, of course, comprise the numerical majority of the total number of pores in the electrode. To provide sufficient surface area, irregular shaped metal particles of a size less than about 10 microns should be used. Carbonyl metal powder composed of individual particles that are chainlike in configuration are preferred. Although because of their irregular configuration no true average size can be given for these particles, the equivalent mean particle size by surface area determination should be about 3 microns.

The size of the large pores in the electrode is, in general, determined by the size of the particles of inert substance which are mixed with the metal particles to make up the self-supporting plate. The large pores, of course, comprise the numerical minority of the total number of pores in the electrode.

Any suitable solid substance which is subject to electrolytic attack and which can be combined with the metal powder to form a self-supporting plate without adversely affecting the properties of the metal my be used as the inert substance. A substance which may be removed by anodic attack may be used. Because the formation process contemplates heat-treating the metal particles to form a metal matrix, as by hot-pressing or sintering, the inert substance should not melt at the temperature at which the formation of the plate will be carried out. Suitable inert substances include anodically attacked carbon materials, such as amorphous carbon. Charcoal is generally preferred for use with most metals and is considered preferable for the production of a porous nickel electrode.

In order to produce an electrode having the requisite porosity characteristics, it is important that the formation of the self-supporting structure should be carried out under conditions which will, in effect, sinter the metal particles into a self-supporting matrix but will leave the particles essentially unchanged as to their extremely large surface area characteristics. It is also considered important that the electrode be as thin as possible so as not to occupy excessive space in the final electrochemical cell, and it is accordingly important that the bonds between the metal particles be sufficiently strong so that a relatively thin electrode may be used without danger of failure through structural weakness. Taking these various requirements into consideration, it has been found that satisfactory electrodes can be produced having wall thicknesses between about 0.2 mm. and about 2 mm., with a wall thickness of about 0.7 mm. being considered preferable.

To produce suitable electrodes having such wall thicknesses, the forming characteristics should be carefully controlled. Varous procedures, such as for example, hot-pressing or cold-pressing followed by sintering may be used. Hot-pressing is preferred. Proper regulation of forming conditions, i.e. pressure, temperature, and time, is important. Of course, it should be understood that these individual conditions are of course interdependent. Hot-pressing pressures between about 200 p.s.i. and 5000 p.s.i. and temperatures between 300° C. and 800° C. may be used for the production of nickel electrodes. The time requirement is primarily dependent upon the temperature selected and may be varied from about 1 minute to about 10 minutes, with about 3 minutes being preferred for temperatures near the middle of the above range. Any suitable forming device can be used, such as a graphite die.

When a composite plate of nickel and charcoal is exposed to anodic attack in an aqueous caustic electrolyte, the charcoal is removed from the plate and becomes suspended in the electrolyte, leaving a porous nickel matrix. Although the exact reaction which occurs during anodic attack is not entirely understood, it is believed that the noncrystalline carbon is broken down into ultrafine granules which become suspended in the liquid electrolyte. Removal of the charcoal leaves a nickel matrix that has large pores extending therethrough approximately equal in dimension to the original particle size of the charcoal which was removed. It is through these pores that air is bubbled into the liquid electrolyte when the electrode is used operationally.

It has been found that an electrode designed to operate with an air supply in the range of about 5 to 30 p.s.i.g. should desirably have void space or porosity equal to between about 40 and about 60 percent of its volume. The total of the large and the small pores makes up this void volume. The large pores, of course, are irregularly shaped. One pore may vary considerably in size along its own length. However, the large pores should be distributed substantially uniformly throughout the entire electrode. With such a uniform distribution, the gas which bubbles through these pores and diffuses to the adjacent area is assured of reaching the entire surface.

It has been found that use of an electrode having large pores in the approximate distribution set forth herein and having good structural strength eliminates the problems previously attendant to flooding. Of course, when the supply of gas is cut off, as when the electrochemical cell is idle, the liquid electrolyte will intrude into the large pores. However, by increasing the gas supply pressure about 2–5 p.s.i.g. above the normal operating pressure for which it is designed, the electrolyte is forced out of the large pores and bubbling begins. When all the pores have been purged, the pressure is returned to its normal level. The strength of an electrode made by the above-described process is sufficient to withstand the increased pressure without any adverse effects.

As previously stated, each of the large pores, which extends through the electrode, is surrounded by a network of interconnected small pores. Although there should be enough large pores so that gas diffuses across the entire electrode, there should not be too many bubbling passageways lest the effectiveness of the electrode diminish because not a high enough percentage of the oxygen in the air is utilized. The amount of inert material included in the initial mixture from whch the plate is formed, in general, determines the number of large pores there will be in the plate.

To produce a suitable porous nickel electrode using charcoal as the inert material, it has been found that the weight ratio of starting materials should be between about 3 and about 20 parts nickel to one part charcoal. A ratio of nickel to charocal of about 12 or 13 parts to one part is preferred. The particles of charcoal should be no more than about 20 microns in their largest dimension. Oversize particles result in oversize pores and significantly decrease the efficiency of the electrode.

After the self-supporting composite plate has been produced, the inert material is removed by electrolytic treatment opposite a dummy electrode in liquid electrolyte, sufficient electrical power being supplied to cause electrolysis. Any suitable anodic treatment may be used to remove charcoal. For example, anodic treatment may be carried out in a bath of an aqueous solution of about 10 percent by weight of KOH at a temperature of about 90° C. Treatment in such a bath for about 12 hours, applying one-half ampere per each square centimeter of electrode area (one side), removes all of the charcoal. After electrolytic treatment is completed, the electrode is washed with water to wash out any carbon that may be trapped in the pores.

After the porous metal plate is formed in the above-described manner, a suitable catalyst may be applied to the electrode using some manner well known to the art, as for example by electroplating. Numerous catalysts which are useful in promoting the electrochemical reaction at electrodes which utilize gaseous reactants are known to those skilled in the art.

However, such a further step is unnecessary because it has been found that the above-described process affords the possibility of forming the electrode with a catalyst incorporated therein. A powdered catalyst may be included in the original mixture from which the self-supporting plate is formed so that it becomes an integral part of the porous metal matrix. The catalyst should not be affected by the forming process nor should it adversely affect the particles of metal. Examples of suitable catalyst include, but are by no means limited to, graphite, manganese, silver, platinum and palladium.

So that the catalyst can be integrally incorporated in the porous matrix, the catalyst should be used in particulate form. Particles of catalyst having a particle size no greater than about 20 microns are used. Preferably, the average particle size of the catalyst is about 10 microns.

A sufficient amount of catalyst should be provided so that, assuming it is uniformly dispersed throughout the electrode, there will be catalyst present in every area to promote the electrochemical reaction. Of course, there must be considerably less catalyst than metal because the structural porous matrix is formed by the metal. The catalyst particles are, in general, "caged" within the surrounding metal matrix. If graphite is used as the catalyst, the ratio of metal powder to graphite should be between about 5 parts and about 15 parts, by weight, nickel to 1 part graphite. Preferably, about 7 parts of nickel are used to each part of graphite. When graphite is used as the catalyst, the self-supporting structure can be formed under the same conditions hereinbefore enumerated, as for example by hot-pressing followed by anodic treatment.

In addition to providing a simple process in which a catalyst can be incorporated within a porous metal electrode as the electrode itself is being formed, the process above described also produces an extremely stable electrode. Despite many charge and discharge cycles, the graphite catalyst remains substantially unaffected and the electrode retains substantially its original value of catalytic activity. This is an important feature in a secondary battery which is subjected to continuous uses under alternating conditions of anodic and cathodic operation over a long period of time. It is believed that the structural arrangement of these electrodes wherein the catalyst particles are "caged" within the porous metal matrix accounts for the excellent electrode stability as compared, for example, with an electrode coated with fine particles or a film of catalyst wh ich inherently has a greater tendency to be gradually removed over long periods of use.

The following examples illustrate the manufacture and operation of electrodes embodying various of the features of the invention. It is to be understood that these examples are merely illustrative and in no way to limit the scope of the invention which is defined by the appended claims.

Example I

A porous cathode plate in the form of a disc about 0.7 mm. in thickness and about one inch in diameter is produced by mixing Inco Type 287 carbonyl nickel powder, graphite and Mallinckrodt Charcoal (Activated NF, Code 4394) in a ratio of 15 parts by weight nickel, to 2 parts graphite and 2 parts charcoal. The graphite and charcoal are ground in a ball mill for about 3 hours so that the particle size is no greater than about 20 microns. The graphite and charcoal powders are then thoroughly mixed with the nickel powder.

About 2 grams of the mixture is placed in a suitable graphite die, having the desired dimensions of the disc, which is disposed within an induction furnace. The graphite die is flooded with a stream of nitrogen to prevent possible oxidation of the die. Pressure is initially applied to cake the mixture and then released. The die is then brought up to about 610° C. and a pressure of 2500 p.s.i. is applied for 3 minutes. The pressed plate is immediately removed from the die and cooled to room temperature.

The plate is immersed in an aqueous solution of 10 percent by weight KOH at 90° C. opposite a dummy cathode. A current of about ½ ampere/$cm.^2$ is applied to the plate as an anode for about 12 hours. At the end of this period, the plate is removed from the bath, washed thoroughly with water to remove any residual carbon, and then dried. The large pores have an average diameter about 20 microns.

The plate is mounted on a nickel support structure, designed so that gas can be applied to the rear surface of the plate, and then assembled as a cathode in a polarization cell filled with an aqueous solution of 25% KOH by weight. Air at a pressure of about 16 p.s.i.g. is supplied to the rear surface of the plate; this results in a flow rate of about 10 cubic centimeters of air per minute per $cm.^2$ of surface and creates bubbling uniformly across the front surface of the plate. The temperature of the electrolyte is regulated to about 65° C.

A nickel anode is disposed in the polarization cell and spaced about 4 mm. from the front surface of the plate. The nickel anode and the cathode are connected to an external D.C. power supply in series with a variable resistor in order to obtain various constant currents.

The cathode potential is measured with a potentiometer versus a zinc reference electrode which is placed between the nickel anode and the cathode front surface, about 2 mm. from each.

The measured open circuit potential is 1.38 volts corresponding to about 0.13 volt on the normal hydrogen scale. When a current of about 100 ma./cm.$^2$ is applied, the potential measures 1.19 volts. Measurements also show that under these conditions about 15% of the oxygen in the air is being used. An increase in the applied current to about 200 ma./cm.$^2$ decreases the potential to 1.00 volt and increases the percentage of oxygen used to about 30%. An increase to a current density of 300 ma./cm.$^2$ decreases the potential to 0.70 volt.

The ohmic portion of the polarization, due to the resistance of the electrolyte between the cathode and the reference electrode, measures about 0.5 ohm.

The cathode is allowed to sit inactive for 12 hours in the polarization cell, and then air pressure is again applied. Increase of the air pressure to about 18 p.s.i.g. is sufficient to force the electrolyte from the large pores and cause bubbling. To test the structural strength of the electrode, the air pressure is raised to 30 p.s.i.g. Although bubbling occurs more rapidly, there is no structural weakness detected in the electrode.

Example II

A composite self-supporting plate is made by hot-pressing 2 grams of a mixture of 10 parts nickel powder and one part charcoal. The same conditions set forth in Example I are repeated to form a plate one inch in diameter and 0.7 mm. thick. The plate is subjected to anodic treatment as in Example I to remove the particles of charcoal and provide a porous nickel matrix.

The porous nickel matrix is immersed in an electroplating solution made by dissolving the following amounts of materials in water and diluting to a one liter solution:

|  | Gms. |
|---|---|
| Silver cyanide | 7 |
| Potassium cyanide | 75 |
| Potassium hydroxide | 15 |

The porous nickel matrix is operated as a cathode opposite a silver foil anode. An electrical current of about 0.15 ampere is applied for 5 minutes to plate silver on the nickel electrode.

The electrode with the catalytic silver electroplated thereon is tested under the same conditions set forth in Example I. The open circuit voltage measures 1.35 volts. At a current density of 100 ma./cm.$^2$, the voltage measures 1.15 volts. At a current density of 200 ma./cm.$^2$, the voltage measures 1.0 volt.

Example III

A porous nickel matrix produced in a manner described in Example II is immersed in an electroplating solution made by dissolving the following amounts of materials in water and diluting to make a one liter solution:

|  | Gms. |
|---|---|
| Palladous chloride, $PdCl_2 \cdot 2H_2O$ | 3.7 |
| Disodium phosphate, $Na_2HPO_4$ | 100 |
| Diammonium phosphate, $(NH_4)_2HPO_4 \cdot 12H_2O$ | 20 |
| Benzoic acid, $C_7H_6O_2$ | 2.5 |

The porous nickel matrix is employed as a cathode opposite a palladium foil anode. The solution is maintained about 50° C., and a current of about 2 ma./cm.$^2$ is applied to the electrodes for about one hour. The porous nickel electrode is removed from the solution, washed and dried. Calculations show that about 1 milligram of palladium per sq. cm. of electrode surface (one side) are deposited upon the porous nickel electrode.

The electrode with the catalytic palladium electroplated thereon is tested under the same conditions set forth in Example I. The open circuit voltage measures 1.4 volts. At a current density of 100 ma./cm.$^2$, the voltage measures 1.1 volts. At a current density of 200 ma./cm.$^2$, the voltage measures 0.9 volt.

The electrodes produced in Examples I, II and III are considered well-suited as electrodes for electrochemical cells. The electrodes made in Examples I and III are suitable for use in secondary batteries. The electrode made in Example II is preferably restricted to use in a primary battery or in a fuel cell because subjection of it to alternating charge and discharge conditions, as are encountered in a secondary battery, results in some deterioration of the electroplated silver catalyst.

It has been found that an electrode having generating properties superior to those made in Examples I, II and III can be provided by depositing a platinum metal catalyst upon a porous matrix by the thermal decomposition of an organic salt of the platinum metal. In general, the porous matrix is first impregnated with a solution of a heat-decomposable soluble organic salt of a platinum metal dissolved in a suitable solvent. The impregnated matrix is heated under suitable conditions to drive off the solvent and decompose the organic salt.

The platinum metal which is incorporated into the porous electrode as a result of this process has excellent adherence to the porous matrix structure, excellent dispersion throughout the matrix, and excellent catalytic activity. Therefore, only a very small amount of the platinum metal need be deposited, per unit of surface area of the electrode, to provide the desired catalytic activity to efficiently promote the electrochemical reaction.

As hereinbefore stated, the particular shape of the electrode may be varied as desired, there being, in general, a liquid-contact face and a gas-supply face. For purposes of simplification, the electrode will hereinafter be referred to as though it is a flat plate designed to be used with one surface in contact with the liquid electrolyte and with a gaseous pressure applied to its other surface.

It is important that the soluble organic platinum metal salt decomposes at a temperature below that which might adversely affect the porosity or the surface configuration of the matrix. Preferably, the thermal decomposition temperature of the soluble organic platinum metal salt selected is well below the sintering temperature of the metal of the porous matrix so that any possible problems with regard to degradation of the surface configuration of the porous metal matrix are avoided. For a nickel matrix, it is preferred that the decomposition temperature of the soluble organic platinum metal salt should be below about 400° C. For a sintered stainless steel matrix, it is preferred that the soluble organic platinum metal salt should decompose below about 450° C.

Some platinum metals are better suited than others for the catalyzation of certain electrochemical reactions. For porous nickel cathodes to be employed in the previously mentioned zinc-air secondary battery, palladium and platinum are the preferred catalysts, with palladium being more preferable.

As previously stated, the platinum metal catalyst is applied to the porous matrix by depositing it from a thermally decomposable soluble organic salt. A suitable organic salt of a platinum metal is used. Platinum metal resinates (the reaction product of a platinum metal salt with a terpene), which include the sulforesinates (wherein a sulfurized terpene is used), are examples of suitable organic salts. Another example of suitable salts are those platinum metal salts described as halogen-platinous mercaptide alkyl sulfide complexes. Examples of specific salts which may be used to deposit palladium upon a nickel matrix include the following organic palladous salts which decompose at about the stated temperatures: palladium sulforesinate (250° C.), chloropalladous ethylmercaptide-methyl butyl sulfide (200° C.), chloropalladous methylmercaptide-propyl sulfide (200° C.).

Impregnation of the porous matrix is carried out in any suitable manner. For example, the soluble organic platinum metal salt may be dissolved in a suitable solvent, and the porous matrix then treated with the solution. Depending upon the soluble platinum metal organic salt chosen, it is well within the skill of the art to select a suitable solvent. In general, solvents such as toluene, trichloroethylene, a terpene, or ethyl acetate are suitable.

Because the excellent dispersion of the platinum metal upon the porous matrix that results from this process and the catalytic activity of the metal so deposited, only a relatively small amount of platinum metal need be deposited per unit of surface area of the electrode in order to provide the desired catalytic properties. In general, it has been found that deposition by this process of from about 0.1 milligram to 5 milligrams of a platinum metal, per square centimeter of electrode surface area (one side), provides the desired catalytic activity to promote the electrochemical reaction. Of course, a greater amount of platinum metal may be deposited; however beyond this range, the further increase in catalytic activity that results is not felt to justify the additional expense. One important advantage of this process is the resultant very effective catalytic activity provided from the use of a relatively small amount of catalyst per unit of surface area. Likewise, lesser amounts of catalyst may also be used but, as stated above, the most economical results are obtained within the stated range. Deposition of palladium within the range of between about 0.1 mg./cm.$^2$, and about 5 mg./cm.$^2$ is most preferred.

The following examples illustrate several processes for applying catalysts using organic platinum metal salts.

Example IV

A porous nickel matrix is produced as described in Example II.

An impregnating solution is prepared by reacting a salt of chloropalladous acid with sulfurized Venetian turpentine to provide a palladous sulforesinate. A sufficient amount of this compound is dissolved in turpentine to impregnate the nickel matrix and leave, after heating, about 0.4 mg. of palladium per square centimeter of surface area (one side) thereon.

The impregnated matrix is heated to 250° C. for 25 minutes to effect decomposition of the organic salt. The resultant matrix is considered suitable for use as an electrode in an electrochemical cell.

Example V

Another porous nickel matrix is made by the process described in Example II.

An impregnating solution is prepared by thinning Engelhard Palladium Resinate Solution, a commercially available solution of a heat-decomposable soluble organic palladium salt with trichloroethylene. Twenty cc. of trichloroethylene are added to 20 milligrams of the resinate solution. This commercial resinate solution contains about 9 percent by weight palladium in the form of a soluble organic salt.

The porous nickel matrix is impregnated with the solution and is then heated to 300° C. for 15 minutes to cause decomposition of the organic salt. The resultant nickel matrix is found to contain about 0.4 milligram of palladium per square centimeter of surface area (one side).

This electrode is tested under the same conditions set forth in Example I. The open circuit measures 1.4 volts. At a current density of 100 ma./cm.$^2$, the voltage measures 1.24 volts. At a current density of 200 ma./cm.$^2$, the voltage measures 1.11 volts and at a current density of 300 ma./cm.$^2$, the voltage measures 1.00 volt.

For purposes of comparison, the electrodes made in Examples III, IV and V are tested using the method described in Example I. The temperature of the electrolyte is regulated in order to test the cathodes at certain predetermined temperatures. Readings are taken of the cathodes at electrolyte operating temperatures of 25° C., 45° C. and 65° C. altering the applied current each time until the potential measures 1.0 volt. The following table shows the current densities (in milliamperes per square centimeter) at each temperature for each of these electrodes.

TABLE I.—CURRENT DENSITY, MA./CM.$^2$ AT 1.0 VOLT VS. ZINC

| Electrode | 25° C. | 45° C. | 65° C. |
|---|---|---|---|
| Example III | 65 | 95 | 150 |
| Example IV | 130 | 210 | 290 |
| Example V | 140 | 220 | 300 |

The electrodes from Examples IV and V are operated for 150 hours anodically in 25 percent KOH at 70° C., at a current density of 500 ma./cm.$^2$, to test the permanency of the palladium on the nickel matrix. After this treatment, the test described above is repeated, and there is no change in the results recorded in Table I.

Comparison of the results in Table I shows that the electrodes made in Examples IV and V are substantially more effective in operation than the comparable plated electrode. They will generate a significantly higher current density, by a factor of about 2, compared to an electrode with the electroplated catalyst when operated under the same conditions. This difference is significant. The life test of 150 hours under anodic treatment shows the excellent adherence of the deposited palladium catalyst to the nickel base and the suitability of this electrode for operation in a secondary battery.

It should be understood that various changes can be made in the processes hereinbefore described without deviating from the present invention. Although the Examples IV and V illustrate the application of a palladium catalyst, it should be understood that other platinum metals can similarly be applied using suitable heat-decomposable soluble organic salts of particular platinum metal desired. Furthermore, electrodes suitable for non-bubbling operation or made by processes other than the electrolytic removal of material may also be treated by the described method to deposit a platinum metal catalyst thereupon.

Various of the features of the invention are set forth in the following claims.

What is claimed is:

1. In a method of making a porous electrode for an electrochemical cell that utilizes a liquid electrolyte and a gaseous reactant, the steps comprising mixing particles of a metal that is resistant to electrolytic attack with particles of noncrystalline carbon, forming said mixture into a self-supporting structure using heat and subjecting the structure to electrolysis in an aqueous electrolyte at a potential sufficient to cause the evolution of oxygen until the noncrystalline carbon is removed from the structure leaving a porous metal matrix.

2. A method of making a porous electrode for an electrochemical cell which utilizes a liquid electrolyte and a gaseous reactant, which method comprises mixing particles of carbonyl metal powder which is resistant to electrolytic attack with particles of noncrystalline carbon, forming said mixture into a self-supporting structure using heat, and subjecting the structure to electrolysis in an aqueous electrolyte at a potential sufficient to cause the evolution of oxygen until the noncrystalline carbon is removed from the structure leaving a porous metal matrix.

3. A method of making a porous electrode for an electrochemical cell which utilizes a liquid electrolyte and a gaseous reactant, which method comprises mixing particles of a metal that is resistant to electrolytic attack, which particles have between about 0.1 and 1 square meter of surface area per gram, with particles of noncrystalline carbon, forming said mixture into a self-supporting structure using heat, and subjecting the structure to electrolysis in an aqueous electrolyte at a potential sufficient to cause the evolution of oxygen until the carbon particles are removed from the structure leaving a porous metal matrix.

4. A method of making a porous electrode for an electrochemical cell which utilizes a liquid electrolyte and a gaseous reactant, which method comprises mixing particles of carbonyl nickel powder with particles of noncrystalline carbon, subjecting said mixture to at least about 200 p.s.i. and about 300° C. to form said nickel particles into a self-supporting structure, and subjecting the structure to electrolysis as an anode in an aqueous electrolyte at a potential sufficient to cause the evolution of oxygen until the carbon particles are removed from the structure leaving a porous nickel matrix, whereby an electrode structure is provided which contains pores in locations from which said carbon particles are removed through which a gas may be readily passed.

5. A method of making a porous electrode for an electrochemical cell which utilizes a liquid electrolyte and a gaseous reactant, which method comprises mixing between about 3 and about 20 parts by weight of carbonyl nickel powder with one part of particles of noncrystalline carbon which are below about 20 microns in particle size, subjecting said mixture to at least about 200 p.s.i. and about 300° C. to form said nickel powder into a self-supporting structure, and subjecting the structure to electrolysis as an anode in an aqueous electrolyte at a potential sufficient to cause the evolution of oxygen until the carbon particles are removed from the structure leaving a porous nickel matrix.

6. A method of making a porous electrode for an electrochemical cell which utilizes a liquid electrolyte and a gaseous reactant, which method comprises mixing particles of metal resistant to electrolytic attack with particles of noncrystalline carbon and with particles of a material which catalyzes an electrochemical reaction, forming said mixture into a self-supporting structure using heat, and subjecting the structure to electrolysis in an aqueous electrolyte at a potential sufficient to cause the evolution of oxygen until the noncrystalline carbon is removed from the structure leaving a porous metal matrix with the particles of catalytic material disposed throughout.

7. A method of making a porous electrode for an electrochemical cell which utilizes a liquid electrolyte and a gaseous reactant, which method comprises mixing particles of carbonyl metal powder resistant to electrolytic attack with particles of noncrystalline carbon and with particles of a material which catalyzes an electrochemical reaction, forming said metal particles into a self-supporting structure using heat, and subjecting the structure to electrolysis in an aqueous electrolyte at a potential sufficient to cause the evolution of oxygen until the carbon particles are removed from the structure leaving a porous metal matrix with the catalytic material dispersed throughout.

8. A method of making a porous electrode for an electrochemical cell which utilizes a liquid electrolyte and a gaseous reactant, which method comprises mixing particles of carbonyl nickel powder with particles of noncrystalline carbon and with particles of a material which catalyzes an electrochemical reaction, applying pressure and heat to form said metal particles into a self-supporting structure, and subjecting the structure to electrolysis in an aqueous electrolyte at a potential sufficient to cause the evolution of oxygen until the carbon particles are removed from the structure leaving a porous nickel matrix.

9. A method of making a porous electrode for an electrochemical cell which utilizes a liquid electrolyte and a gaseous reactant, which method comprises mixing particles of carbonyl nickel powder resistant to electrolytic attack with particles of noncrystalline carbon and with particles of graphite, applying at least about 200 p.s.i. while heating to at least about 300° C. to form said nickel particles into a self-supporting structure, and subjecting the structure to electrolysis in an aqueous electrolyte at a potential sufficient to cause the evolution of oxygen until the carbon particles are removed from the structure leaving a porous nickel matrix with particles of graphite disposed throughout.

10. A method of making a porous electrode for an electrochemical cell which utilizes a liquid electrolyte and a gaseous reactant, which method comprises mixing particles of carbonyl metal powder resistant to electrolytic attack with particles of noncrystalline carbon, subjecting said mixture to heat and pressure to form said metal particles into a self-supporting structure, subjecting the structure to electrolysis as an anode in an aqueous electrolyte at a potential sufficient to cause evolution of oxygen until the carbon particles are removed from the structure leaving a porous metal matrix, and depositing a material suitable for the catalysis of an electrochemical reaction upon said metal matrix.

11. A method of making a porous electrode for an electrochemical cell which utilizes a liquid electrolyte and a gaseous reactant, which method comprises mixing particles of carbonyl nickel powder with particles of noncrystalline carbon, subjecting said mixture to heat and pressure to form said nickel particles into a self-supporting structure, subjecting the structure to electrolysis as an anode in an aqueous electrolyte at a potential sufficient to cause evolution of oxygen until the carbon particles are removed from the structure leaving a porous nickel matrix, and electroplating a material suitable for the catalysis of an electrochemical reaction upon said nickel matrix.

12. A method of making a porous electrode for an electrochemical cell which utilizes a liquid electrolyte and a gaseous reactant, which method comprises mixing particles of carbonyl nickel powder with particles of noncrystalline carbon, subjecting said mixture to heat and pressure to form said nickel particles into a self-supporting structure, subjecting the structure to electrolysis as an anode in an aqueous electrolyte at a potential sufficient to cause evolution of oxygen until the carbon particles are removed from the structure leaving a porous nickel matrix, dissolving a palladium resinate in a solvent therefor, impregnating the porous nickel matrix with sufficient of said solution to deposit at least about 0.1 mg./sq. cm. of palladium thereupon, and heating said impregnated nickel matrix to between about 250° C. and about 350° C. until said solvent is driven off and said resinate has decomposed, whereby a porous nickel electrode incorporating a palladium catalyst is provided.

13. A method of making a porous electrode for an electrochemical cell which utilizes a liquid electrolyte and a gaseous reactant, which method comprises mixing about 15 parts by weight carbonyl nickel powder of a particle size less than about 20 microns with about 2 parts particles of charcoal and with about 2 parts particles of graphite, grinding the particulate mixture so all the particles are less than about 20 microns, applying at least about 2500 p.s.i. and heating to about 600° C. for 3 minutes to form said nickel particles into a self-supporting structure, immediately removing said heat and subjecting the structure to electrolysis as an anode in an aqueous caustic electrolyte until the carbon particles are removed from the structure leaving a porous nickel matrix with particles of graphite dispersed throughout.

14. A method of making a porous electrode for an electrochemical cell which utilizes a liquid electrolyte and a gaseous reactant, which method comprises mixing about 12 parts by weight carbonyl nickel powder of a size less than about 20 microns with one part particles of charcoal, applying about 2500 p.s.i. and 600° C. to said mixture for 3 minutes to form said nickel particles into a self-supporting structure, immediately removing the heat, subjecting the structure to electrolysis as an anode in a liquid electrolyte until the carbon particles are removed from the structure leaving a porous nickel matrix, dissolving a palladium resinate in a solvent therefor, impregnating the porous nickel matrix with sufficient of said solution to deposit at least about 0.1 mg./sq. cm. of palladium thereupon, and heating said impregnated nickel matrix to between about 250° C. and about 350° C. until said solvent is driven off and said resinate has decomposed, whereby a porous nickel electrode incorporating a palladium catalyst is provided.

15. In an electrode for an electrochemical cell that utilizes a liquid electrolyte and a gaseous reactant, a thin porous matrix between about 0.2 mm. and about 2 mm. in thickness of an electrically conductive metal which has a liquid-contact surface and a gas-supply surface and which also has a minority of large pores extending between said surfaces and a majority of small pores forming a network of interconnected small pores in communication with each of said large pores, the void volume of said matrix being equal to between about 40 and about 60 percent of total volume, said large pores having an average diameter of about 20 microns and being substantially uniformly distributed across said liquid-contact surface, whereby a gaseous reactant supplied to said gas-supply surface at an operating pressure between about 5 p.s.i.g. and about 30 p.s.i.g. will bubble through said porous matrix into the liquid electrolyte.

16. In an electrode for an electrochemical cell that utilizes a liquid electrolyte and a gaseous reactant, a thin porous matrix between about 0.2 mm. and about 2 mm. in thickness of an electrically conductive metal which has a liquid-contact surface and a gas-supply surface and which also has a minority of large pores extending between said surfaces and a majority of small pores forming a network of interconnected small pores in communication with each of said large pores, the void volume of said matrix being equal to between about 40 and about 60 percent of total volume, said large pores having an average diameter of about 20 microns and being substantially uniformly distributed across said liquid-contact surface, and material for catalyzing an electrochemical reaction disposed throughout said metal matrix, whereby a gaseous reactant supplied to said gas-supply surface at an operating pressure between about 5 p.s.i.g. and about 30 p.s.i.g. will bubble through said porous matrix into the liquid electrolyte.

17. In an electrode for an electrochemical cell that utilizes a liquid electrolyte and a gaseous reactant, a thin porous nickel matrix about 0.7 mm. in thickness which has a liquid-contact surface and a gas-supply surface and which also has a minority of large pores extending between said surfaces and a majority of small pores forming a network of interconnected small pores in communication with each of said large pores, the void volume of said matrix being equal to between about 40 and about 60 percent of total volume, said large pores having an average diameter of about 20 microns and being substantially uniformly distributed across said liquid-contact surface, and a platinum metal catalyst deposited upon said porous metal matrix.

18. In an electrode for an electrochemical cell that utilizes a liquid electrolyte and a gaseous reactant, a thin porous nickel matrix about 0.7 mm. in thickness which has a liquid-contact surface and a gas-supply surface and which also has a minority of large pores extending between said surfaces and a majority of small pores forming a network of interconnected small pores in communication with each of said large pores, the void volume of said matrix being equal to between about 40 and about 60 percent of total volume, said large pores having an average diameter of about 20 microns and being substantially uniformly distributed across said liquid-contact surface, and a palladium catalyst coating said porous metal matrix, which catalyst has been deposited thereupon by decomposition of a heat-decomposable organic palladium salt.

References Cited

UNITED STATES PATENTS

| | | | |
|---|---|---|---|
| 3,282,738 | 11/1966 | Langer et al. | 136—122 X |
| 2,689,294 | 9/1954 | Weber et al. | 117—227 |
| 3,113,048 | 12/1963 | Thompson | 136—86 |
| 3,207,600 | 9/1965 | Hirai et al. | 75—201 |
| 3,239,382 | 3/1966 | Thompson | 136—86 |
| 2,860,175 | 11/1958 | Justi | 136—86 X |
| 3,077,507 | 2/1963 | Kordesch et al. | 136—86 |

FOREIGN PATENTS

| | | |
|---|---|---|
| 239,130 | 12/1957 | Australia. |
| 670,140 | 9/1963 | Canada. |

OTHER REFERENCES

Mitchell, R. W., Equipment for the Cleaning of Metal. In Metal Cleaning and Finishing Magazine, October 1932, p. 541 relied on.

WINSTON A. DOUGLAS, *Primary Examiner.*

O. F. CRUTCHFIELD, *Assistant Examiner.*